March 12, 1935. R. W. ELLINGHAM 1,993,879
METHOD OF MAKING A REAMER
Filed June 22, 1931
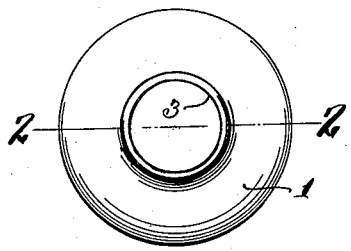
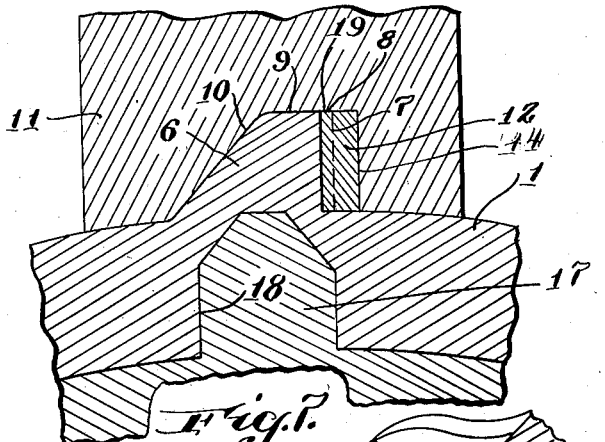
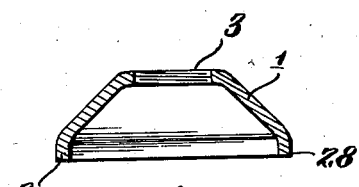
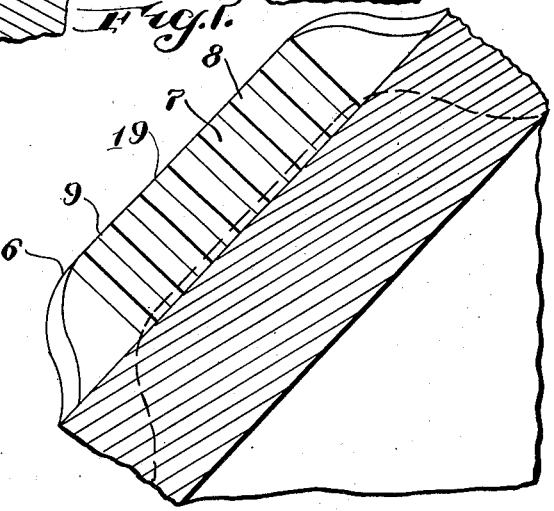
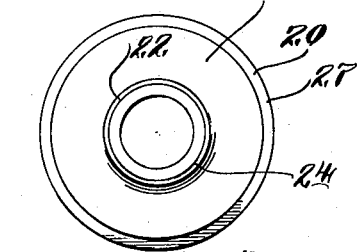
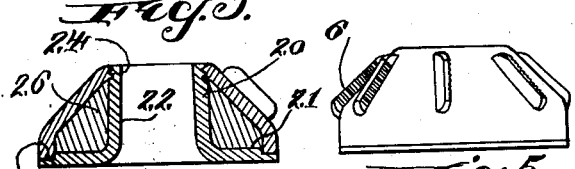
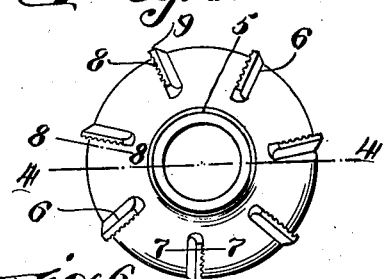
Inventor
Robert W. Ellingham
By Edwin F. Samuels
Attorney Patented Mar. 12, 1935

1,993,879

UNITED STATES PATENT OFFICE 1,993,879

METHOD OF MAKING A REAMER

Robert W. Ellingham, Hampden County, Mass., assignor to The Black & Decker Manufacturing Company, Towson, Md., a corporation of Maryland Application June 22, 1931, Serial No. 546,026

7 Claims. (Cl. 76—101)

Up to comparatively recent years the practice in making reamers has been confined to the method of producing them from tool steel by cutting the teeth and body from the same piece of material so that the teeth were integral with the body, the practice followed being parallel to that followed in making milling cutters and other types of metal cutting tools. Later, the practice of using inserted blades was devised and was followed in the production of reamers, the blades being held in position in various ways. Still later practice consists in forming the body of the cutter of thin sheet steel and producing the blades by slotting the metal and forcing the edges outward, the protruding edges being sharpened to form the cutting edges.

It will be easily understood that the production of reamers entirely of tool steel involves a comparatively large expense in material and labor. The reamer with the inserted blades is also relatively expensive.

The cheapest method of production is that which consists in making the body of sheet metal and forming the blades from the metal of the body but reamers made in accordance with the practice outlined, i. e., by slotting the body member to produce the cutting edges are regarded as defective on account of the lack of sufficient support for these edges.

In accordance with the present invention a reamer is made from sheet metal with a very slight expenditure for material and labor by first drawing the sheet metal into the form of a cup and then embossing or pressing the material and thus deflecting it to form the teeth, the sheet metal forming the body of the cutter or cup not being cut or punctured in the immediate vicinity of the cutting edges, the continuity of the material and its full supporting effect are maintained.

The front faces of the blades are preferably fluted or notched to afford the advantages of a fluted cutting edge and these flutes are preferably staggered so that the flutes of the successive teeth do not follow in the same circumferential path.

In the accompanying drawing I have illustrated a reamer in the various stages of production and I have also shown fragmentarily a die for making the reamer in accordance with the preferred form and method of the invention.

In the drawing:

Figure 1 is a top plan view of a sheet metal reamer blank prior to the formation of the teeth.

Figure 2 is a section through the same on the line 2, 2 in Figure 1.

Figure 3 is a top plan view of the bushing and base member.

Figure 4 is a section through the reamer on the line 4, 4 in Figure 6.

Figure 5 is a side elevation of the completed reamer.

Figure 6 is a top plan view of the same.

Figure 7 is an enlarged section through one of the teeth on the line 7, 7 in Figure 6, showing the die and punch in the operation of forming the teeth.

Figure 8 is a section on an enlarged scale taken parallel to one of the teeth and looking at the tooth from a radial plane, the line of section being indicated at 8, 8 in Figure 6.

Referring to the drawing by numerals, Figures 1 and 2 show the sheet metal of which the reamer is to be composed drawn into the form of a frustro conical cup indicated by reference character 1. This cup or blank has a cylindrical flange 2, extending circumferentially around the bottom and a central axial opening 3 at the top.

Figures 1 and 2 also show the opening 3 threaded at 5. These threads are right handed, the reamer teeth being arranged to cut by right handed rotation as seen from the base. The teeth 6 project from the reamer body in accordance with the usual arrangement of reamer teeth, the front or cutting face 7 of each tooth being disposed substantially in a radial plane and being fluted at 8 to provide a fluted cutting edge formed by the intersection of the front face 7 of each tooth and the outer conical face or surface 9. The teeth 6 are formed successively by punching the metal outwardly into a corresponding die cavity 10 formed in the die member 11, each individual tooth 6 with the flutes 8 in the front surface 7 thereof being formed by a single punching operation. Preferably the flutes 8 in each individual tooth are staggered as to the corresponding flutes in the next succeeding tooth, i. e., placed out of alignment in the direction of rotation to improve the smoothness of the cut, and the facility of cutting. This staggering of the flutes is accomplished by means of a movable die member 12 which is seated in the die 10 in a suitable rabbeted seat 14, the movable member 12 being changed progressively as to its position in the direction of its length, i. e., transversely to the plane of the section, Figure 7, for each of a series of teeth after which it may be returned to its original location when a new series of flutes is formed by similar successive placing of the teeth or flutes.

In the present instance the teeth are preferably arranged in series of three, but the number of teeth in such a series is not material. In the formation of the teeth a male die member or punch 17 is employed which supports the metal in alignment with the cavity 10 in the female die 11 which die is reciprocated toward and from the male die 17. In the formation of each tooth the female die 11 descends, displacing the metal opposite the die cavity 10, causing the displaced metal to flow into the cavity, forming the tooth 6. The entrance of the punch or male die member 17 into the metal forming the cup 1, i. e., the displacement of the metal forming the tooth, produces a cavity 18 back of each tooth, but the outer surface of the metal is not broken, slotted or apertured in any way, and the full strength and continuity of the metal are preserved to support the cutting edge 19. The die member 18 has the effect of restricting the outward flow of the metal to give the outer surface of the tooth the desired toothed shape. The chamber or cavity 18 with its substantially continuous outer walls leaves sufficient metal to support the tool on all sides.

In addition to the toothed cup member 1 with its teeth 6 and tongues or keys 5, the reamer comprises a bushing and base member 20 having a base 21 and a central tubular bushing 22, which is adapted to engage an arbor or shaft on which the reamer is mounted during the cutting operation.

As one means for connecting the bushing and base member 20 to the cup member 1 carrying the teeth 6, the upper end of the bushing 22 is threaded at 24 to correspond to the threads 5 in the opening 3 in the bushing, and the edge of the base 21, which is circular, is rabbeted at the top edge at 27, the rabbet extending circumferentially about the periphery of the base.

In assembling the tool which is performed after the formation of the teeth, the bushing is inserted from below through the opening 3 and the threads 24 on the bushing are engaged with threads in the opening 3 in the cut, the bottom peripheral edge 28 of the cup being seated in the rabbet 27 in the base. The driving torque which is communicated from the arbor to the bushing 22 and from the bushing by way of the threads 24 and 5 to the cup 1, carrying the teeth 6, serves to tighten the engagement of the bushing with the cup.

The hollow within the cup between the cup and the reamer is preferably filled at 26 with cheap metal as spelter to give it the desired weight. This can be introduced through a hole formed in the base 21 for this purpose, the metal being introduced in a manner well known to the art, the exact manner of introducing the metal being no part of the invention.

The reamer which is produced in the practice of the method thus comprises a sheet metal body with which the teeth are formed integrally being embossed or pressed outwardly from the body of the metal without puncturing or severing the metal sheet, thus preserving the continuity of the metal and its full supporting effect in all directions, giving much greater strength to the teeth than when the cutting edges are formed by severing the metal and deflecting the cut portions outwardly.

The method of producing the reamer is regarded as a feature of the invention, particularly as to the method of forming each tooth with the serrated edge in a single operation and also the construction of the reamer by drawing a sheet metal cup portion in one piece and a bushing and base in another piece whereby it is composed of two pieces of sheet metal and assembled to form a complete reamer and bushing. The manner of connecting the base and bushing to the cup whereby the driving torque is transmitted from the arbor to the bushing and hence to the cup or body of the reamer by way of threads 5 and 24, is also of interest.

I have thus described specifically and in detail a sheet metal reamer having embossed teeth formed thereon by displacement of the metal without cutting and the method of making the same, the description being specific and in detail in order that the method of the invention and the manner of operating, applying and using the same may be fully understood, however, the specific terms herein are used descriptively rather than in a limiting sense, the scope of the invention being defined in the claims.

What I claim as new and desire to secure by Letters Patent is:

1. The method of making a reamer which consists in forming a cup of sheet metal by drawing, and forming radial teeth on the outer surface of the cup by displacing the metal outwardly causing it to flow into a die, without severing the outer surface, the teeth converging substantially in the direction of the axis.

2. The method of forming a mutiple toothed reamer which consists in forming a frustro conical cup of sheet metal and forming each tooth separately and successively by punching the metal outwardly to form a chamber at the base of each tooth and simultaneously restricting from without the outward flow of the metal whereby the outer surface of the tooth is determined, the outer walls of the chamber being substantially continuous providing a support for the tooth at the front and rear.

3. The method of forming a reamer which consists in forming a frustro conical cup of sheet metal and forming each tooth successively by punching the metal outwardly causing it to flow into a die forming an aperture at the base of each tooth without severing the metal adjacent the cutting edge.

4. The method of forming a reamer which consists in forming a frustro conical cup of sheet metal and forming teeth successively with fluted forward faces by punching the metal outwardly into a die having corresponding flutes forming an aperture at the base of each tooth without severing the metal adjacent the cutting edge and changing the position of the flutes in the die after each punching operation to stagger the flutes in the teeth.

5. The method of forming a reamer which consists in forming a frustro conical cup of sheet metal and forming teeth by punching the metal outwardly causing it to flow into a die, forming a bushing and base member of sheet metal and connecting the two together by inserting the bushing in the cup and interengaging the bushing with the adjacent portions of the cup, the cup being apertured to receive the bushing.

6. The method of forming a reamer which consists in forming a frustro conical cup of sheet metal and forming teeth by punching the metal outwardly into a die, forming a bushing and base member of sheet metal and connecting the two together by inserting the bushing in the cup and interengaging the bushing with the adjacent portions of the cup, the cup being apertured to receive the bushing and filling the apertures between the bushing and cup with molten metal.

7. The method of forming a multiple toothed reamer which consists in forming a frustro conical cup of sheet metal and forming each tooth successively by punching the metal outwardly, causing it to flow outwardly forming a depression at the base of each tooth without severing the metal and simultanously restricting from without the outward flow of the metal whereby the outer surface of the tooth is determined.

ROBERT W. ELLINGHAM.